(No Model.)
G. J. DRYDEN.
CARRYING BELT FOR HARVESTERS.
No. 463,110. Patented Nov. 10, 1891.
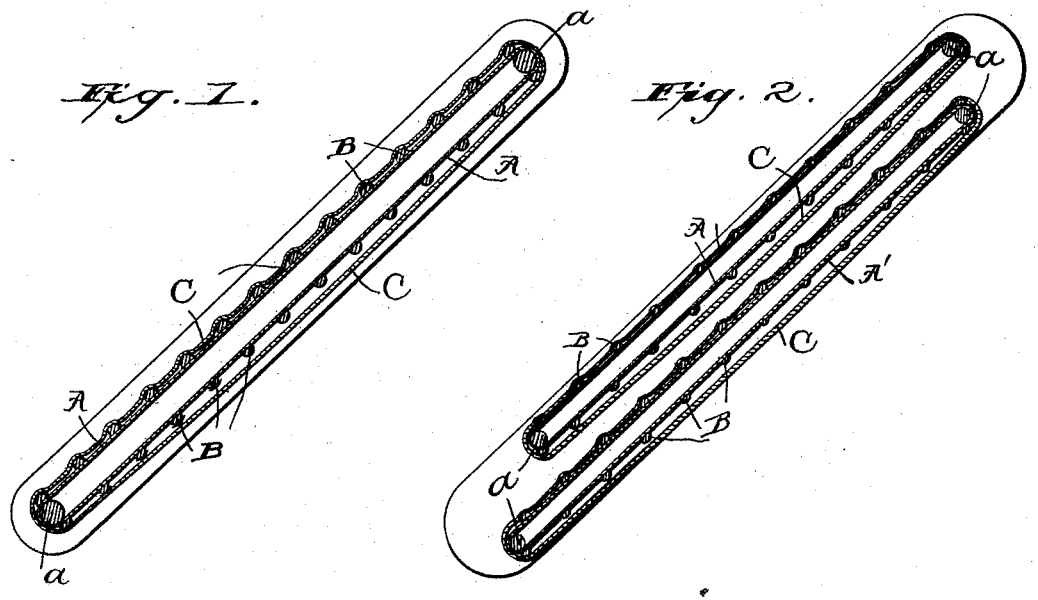
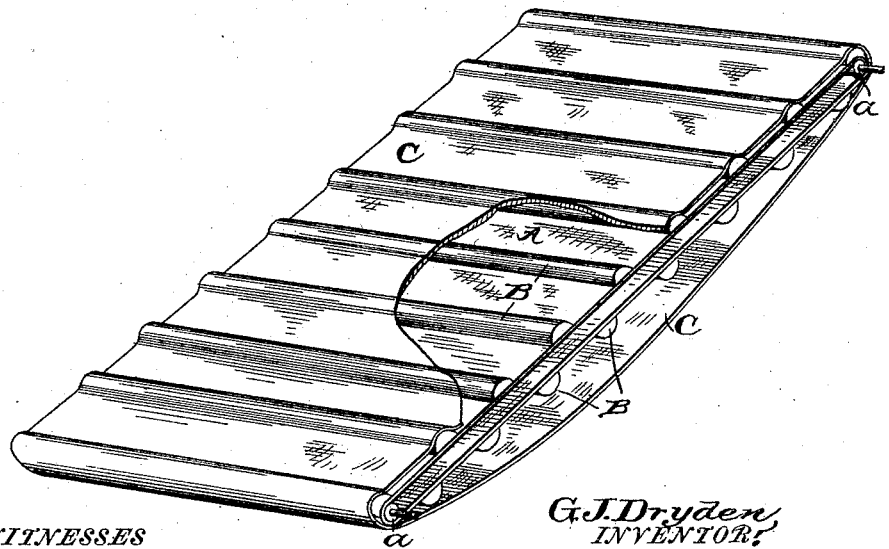
WITNESSES
A. J. Schwartz
J. F. Reily
G. J. Dryden,
INVENTOR
By W. J. Fitzgerald,
Attorneys

UNITED STATES PATENT OFFICE.

GEORGE J. DRYDEN, OF BRUSSELLS, MISSOURI.

CARRYING-BELT FOR HARVESTERS.

SPECIFICATION forming part of Letters Patent No. 463,110, dated November 10, 1891.

Application filed October 11, 1890. Serial No. 367,760. (No model.)

*To all whom it may concern:*

Be it known that I, GEORGE J. DRYDEN, a citizen of the United States, residing at Brussells, in the county of Lincoln and State of Missouri, have invented certain new and useful Improvements in Carrying-Belts for Harvesters; and I do hereby declare the following to be a full, clear, and exact description of the invention, such as will enable others skilled in the art to which it appertains to make and use the same.

My invention consists in certain new and useful improvements in carrying-belts for harvesters, which will be hereinafter fully described and claimed.

Referring to the accompanying drawings, Figure 1 is a longitudinal sectional view of a single carrying-belt provided with my improvement. Fig. 2 is a similar view of the two parallel belts hereinafter described, and Fig. 3 is a perspective front view of the single carrying-belt with a part of the outer protecting-belt broken away.

The same letters of reference indicate corresponding parts in all the figures.

Referring to the several parts by letter, A indicates an ordinary endless belt, which travels around the rollers $a$ $a'$ in the frame of a grain-harvester for elevating the grain from the sickle, and upon this belt are secured the usual series of transverse cleats B.

C indicates a canvas belt (or it may of course be of any other suitable material) of the same width as the belt A, but which has no cleats secured upon it. This plain belt I place around the outer side of the belt A, securing or connecting it at one point to said belt, so that the two belts will usually travel together. The object and great advantage of my invention are that the outer belt prevents the grain, especially short grain, from catching on or under the edges of the transverse cleats, and thereby choking the machine, which is always liable to occur with the lifting-belts now in use, my outer protecting canvas belt C completely covering the transverse cleats of the inner belt A, and at the same time the outer canvas belt C, which is slightly longer and therefore looser than the inner belt A, to which it is secured, will conform to the shape of the cleats under it, so as to permit the cleats to act on the grain and lift it as the belts travel up, so that the outer belt will not interfere in the least with the effectiveness of the cleats on the inner belt. The outer belt being attached at but one point of the inner belt, the former will be kept more or less taut, and will become specially so when the grain becomes clogged at the entrance of the elevator, in which case the cleats will not be able to act as directly thereon, and the particles of grain are thus gradually removed from the clogged mass. On the other hand it will be seen that were the cleats unprotected by such outer covering they would come squarely in contact with the clogged mass, and thus stop the movement of the belt to which they are secured.

I am aware of the existence of Patent No. 384,458, granted to one Matthews, June 12, 1888, for improvements in endless carriers, and I make no claim in conflict therewith.

In Fig. 2 I have shown my invention applied to two parallel elevating-belts A A', the grain being carried up between the two belts, which are provided with the usual transverse cleats B and have my outer protecting-belt C secured around them, as shown.

Having thus described my invention, what I claim, and desire to secure by Letters Patent, is—

An elevator-belt for harvesters, consisting of the revolving inner belt having the transverse cleats secured thereto and the outer belt placed loosely around and outside of the said inner belt and secured thereto at one point only, substantially as described, and for the purpose set forth.

In testimony whereof I affix my signature in presence of two witnesses.

GEO. J. DRYDEN.

Witnesses:
OMAR H. AVERY,
CHAS. MARTIN.